Feb. 27, 1923.

H. TAYLOR

FAN PULLEY

Filed Mar. 8, 1920

1,446,596

2 sheets-sheet 1

Inventor:
Hunton Taylor
By Fred Gerlach
his Atty.

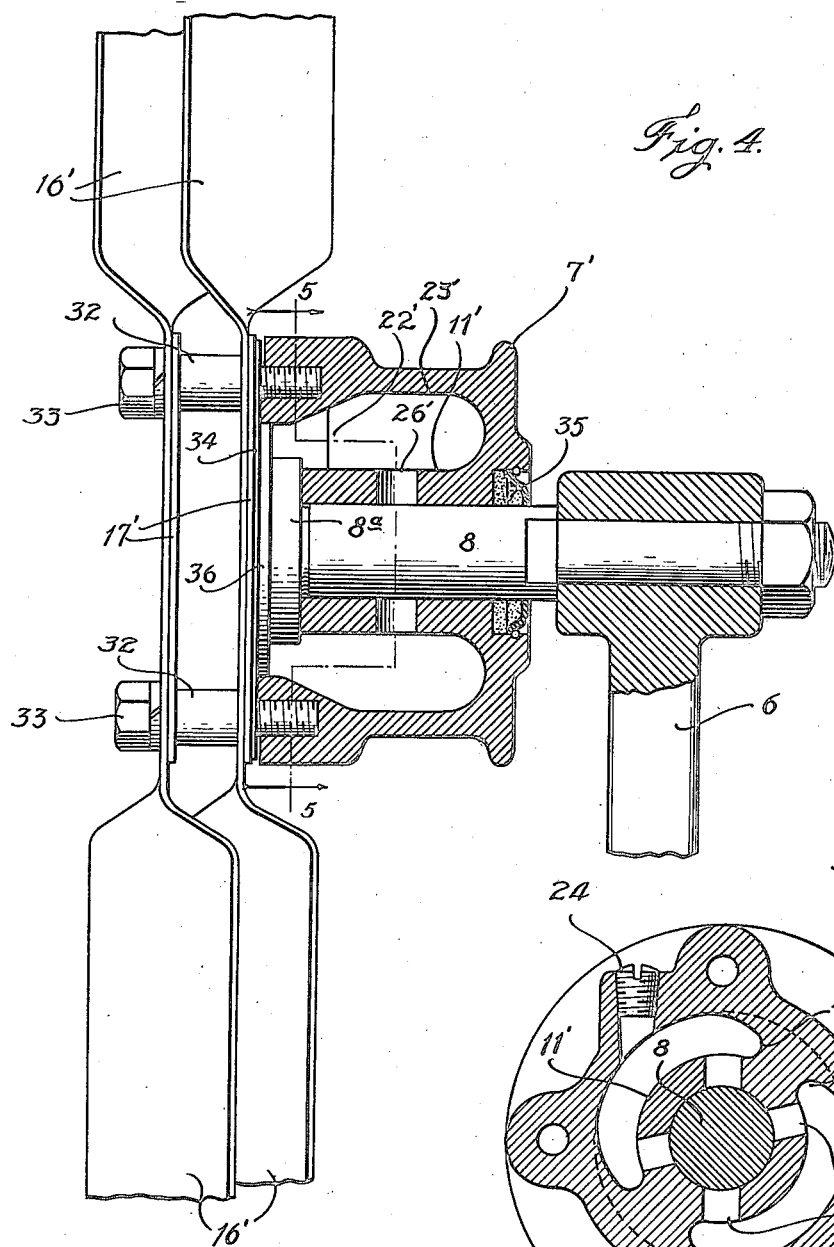

Patented Feb. 27, 1923.

1,446,596

UNITED STATES PATENT OFFICE.

HUSTON TAYLOR, OF DETROIT, MICHIGAN, ASSIGNOR TO DETROIT CARRIER & MANUFACTURING CO., OF DETROIT, MICHIGAN, A CORPORATION OF DELAWARE.

FAN PULLEY.

Application filed March 8, 1920. Serial No. 364,025.

*To all whom it may concern:*

Be it known that I, HUSTON TAYLOR, a citizen of the United States, and a resident of Detroit, in the county of Wayne and State of Michigan, have invented certain new and useful Improvements in Fan Pulleys, of which the following is a full, clear, and exact description.

The invention relates to pulleys and fans for cooling internal combustion engines used on vehicles.

The object of the invention is to provide a pulley of this character with improved lubricating means and an improved means of attaching the fan and pulley together.

The invention consists in the several novel features hereinafter set forth and more particularly defined by claims at the conclusion hereof.

Figure 1:
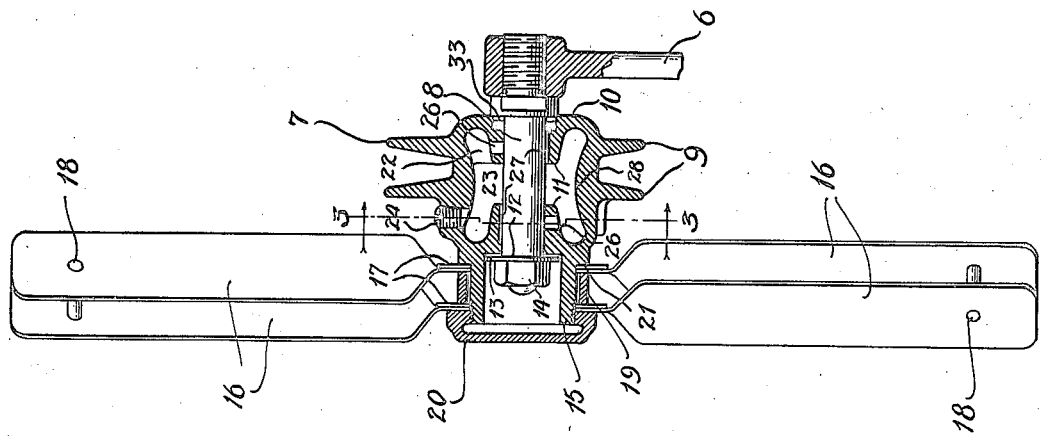
Figure 3:
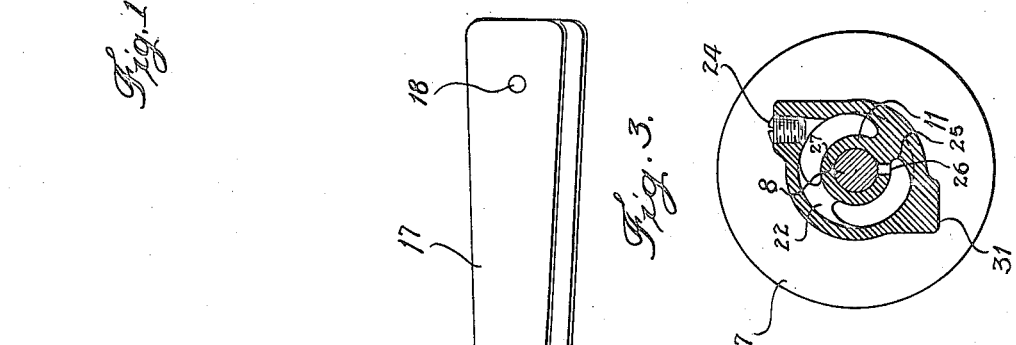
Figure 2:
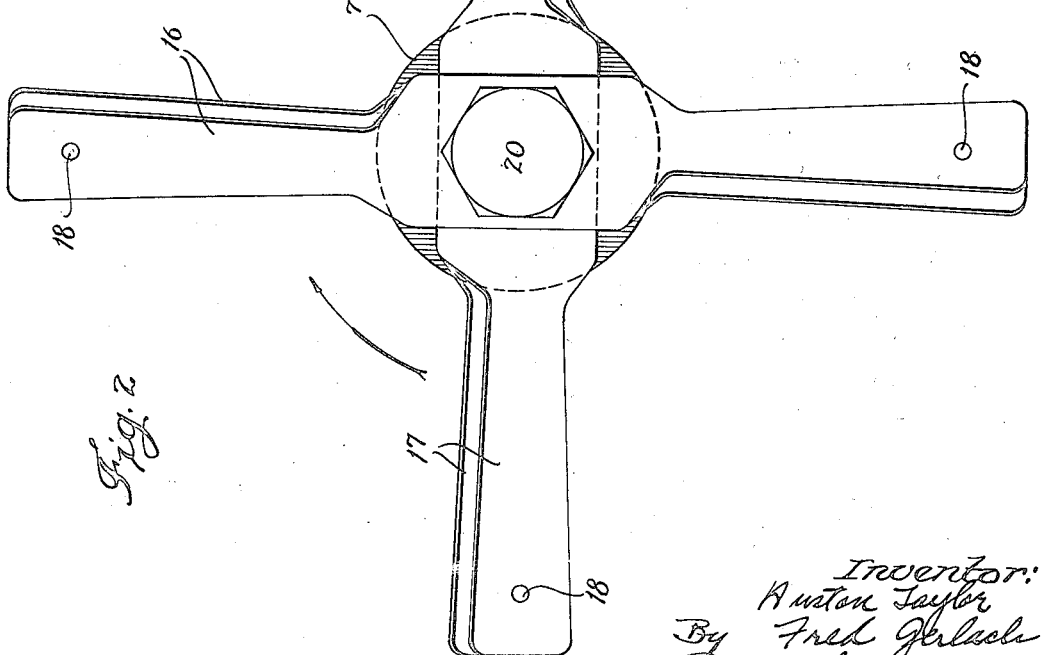

In the drawings: Fig. 1 is an axial section of a pulley and fan embodying the invention. Fig. 2 is a face view of the fan and pulley. Fig. 3 is a section on line 3—3 of Fig. 1. Fig. 4 is a section of a modified form of the invention. Fig. 5 is a section on line 5—5 of Fig. 4.

The pulley 7 is mounted upon a spindle 8 which is adapted to be connected to, and supported by, a suitable bracket 6 being usually provided with a screw-thread at one end for that purpose. The pulley is provided with a body having a grooved periphery formed by flanges 9 for a belt to drive the pulley and fan. The pulley has end-walls 10 and inwardly extending hubs 11 integral with the periphery or body. The spindle 8 has a shoulder 12 and a washer 13 held by a nut 14, and the pulley is held against longitudinal movement by said shoulder and washer.

The pulley is formed with an integral boss 15 projecting from its outer end and a fan consisting of crossed blades 16 and 17. In the fan shown, there are plural blades longitudinally and slightly in rotative advance of one another and spaced apart by rivets 18 and a sleeve 19. A cap-nut 20 screw-threaded to the end of boss 15 is adapted to clamp the hubs of the fan-blades and sleeve 19 against a shoulder 21 to secure the entire fan on, and for rotation with, the pulley and also serves to close the outer end of the boss 15.

A deflector 22 integral with the pulley is provided between each hub 11 and the body of the pulley. The chamber 23 in the pulley is adapted to retain oil received through a filling plug 24. Each hub 11 is formed with a hole 26 to conduct oil from said chamber to the spindle 8, to keep the bearing surfaces thoroughly lubricated. The face 25 of each deflector 22 adjacent a hole 26 is shaped so that it will, during rotation of the pulley, direct the oil to said hole. A distributor groove 27 is formed in each hub 11 and extends to the inner end thereof. The periphery 28 of the chamber 23 is flared from its center to equally distribute the oil to the deflectors. The pulley is provided with a portion 31 to counter-balance the plug 24. The holes 26 are disposed in rotative advance of the deflectors 22. For convenience in manufacture of pulleys for either right or left drive, both faces 25 of the deflectors are formed to carry the lubricant inwardly to the hubs, so that by forming the holes on either side of the deflectors, the lubricating means will be operative according to the direction in which the pulley is driven. A packing ring 33 is provided at the inner end of the pulley to prevent the escape of lubricant. The outer end of the pulley being closed by cap, no packing is necessary for the outer hub 11. The deflectors are disposed on opposite sides of the spindle to counterbalance one another.

In operation, the rotating deflectors will forcibly feed the lubricant to and through the holes 26 to the spindle and so that the bearing surfaces between the spindle and the pulley will be flushed by the oil forced between said surfaces.

In the modification shown in Figs. 4 and 5, the pulley 7' is provided with one hub 11' extending inwardly from one end of the pulley and two oppositely disposed deflectors 22' similar in shape and function to those shown in Figs. 1 and 3 are formed between the periphery of the oil chamber 23' and said hub. Holes 26' are formed in rotative advance of said deflectors to force the oil to the bearing surfaces as herein aforesaid. An oil inlet closed by a plug 24 also is provided in this modification. The outer end of the chamber 23 extends to the outer end of the pulley and is there closed by the fan. Bolts 33 extend through the hubs of the fan-blades 16' and 17', spacers 32 and a packing ring 34 to clamp them all to the outer end of the pulley, a packing-ring 35 is provided at the inner end of the pulley. A head 8ᵃ on the outer end of the spindle holds the pulley against outward movement on the spindle. An abutment disk 36 on the fan holds the pulley against inward movement on the spindle.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination of a spindle, and a pulley rotatable on the spindle and comprising a body having a closed chamber therein adapted to retain lubricant, a peripheral wall surrounding the chamber, a hub in the chamber having a hole leading to the spindle, and a deflector wall integral with the body extending entirely across the space between the peripheral surrounding wall and the hub and sloping inwards towards the axis of the spindle to force the lubricant to said hole when the pulley is rotated.

2. The combination of a spindle and a pulley rotatable on the spindle and comprising a body having a closed chamber therein and a peripheral wall and a hub in the chamber having a hole leading to the spindle, and a deflector wall integral with the body extending entirely across the space between the hub and the peripheral wall and having portions sloping inward towards the axis of the spindle to force the lubricant to said hole during rotation of the pulley in opposite directions respectively.

3. The combination of a spindle and a pulley, rotatable on the spindle and comprising a body having a chamber therein, means to supply lubricant to said chamber, means to close the ends of the chamber, inwardly extending hubs having holes therein leading to the spindle, and oppositely disposed deflectors adjacent the hubs respectively having surfaces to force the lubricant towards said hubs, the periphery of said chamber being flared from its center outwardly to distribute the lubricant to the ends of the pulley.

4. The combination of a spindle, a pulley rotatable on said spindle, and a fan, comprising blades, the pulley comprising a body having a chamber therein and closed ends, means in the pulley to force lubricant towards the spindle and a boss on the pulley extending through the fan-blades, and a nut on the boss for clamping the blades on the pulley.

5. The combination of a spindle, a pulley rotatable on said spindle, and a fan comprising blades, the pulley comprising a body having a chamber therein, and closed ends, means in the pulley to force lubricant towards the spindle, a boss on the pulley extending through the fan-blades, and a cap-nut on the boss for clamping the blades on the pulley and extending over the end of the boss.

6. The combination of a spindle, a pulley rotatable on said spindle, and a fan comprising blades, the pulley comprising a body having a chamber therein and closed ends, a hub in the body having a hole therein leading to the spindle, a deflector having a surface to force lubricant to said hole.

HUSTON TAYLOR.